Feb. 11, 1969  E. J. SMITH  3,426,899
AERATION APPARATUS
Filed July 8, 1966
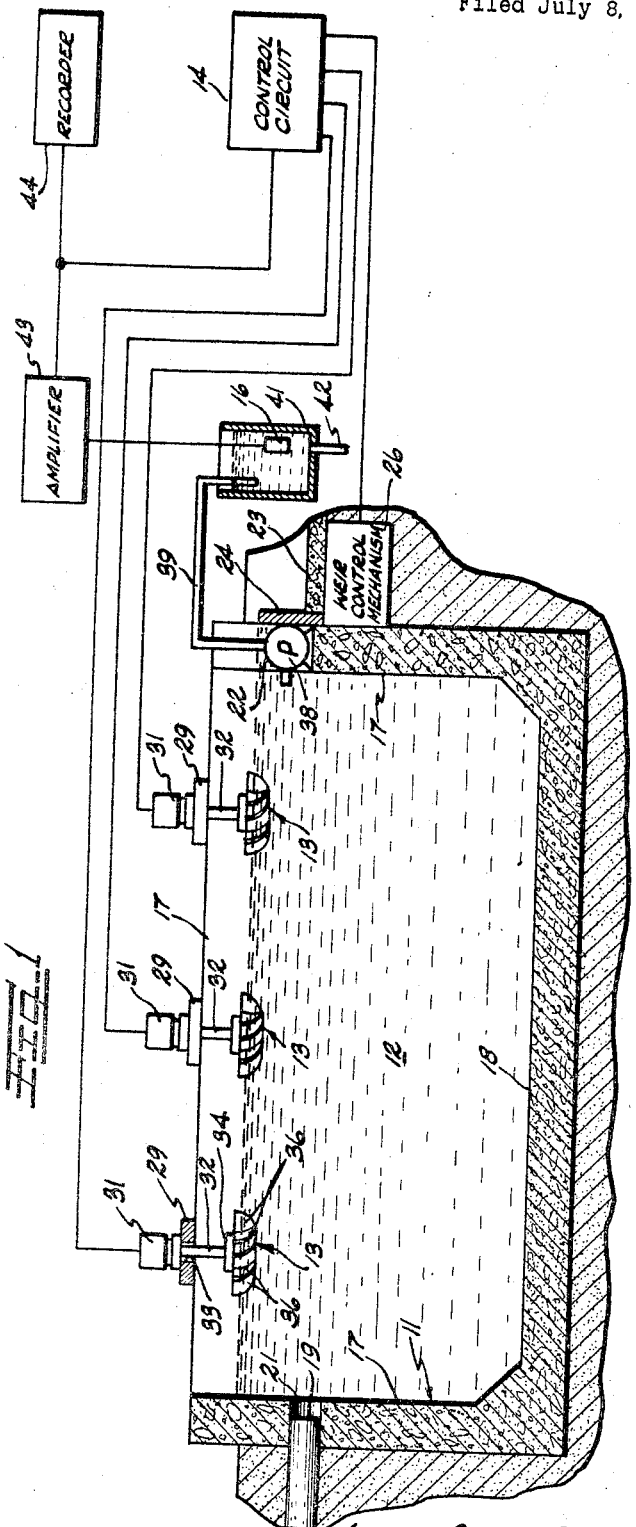
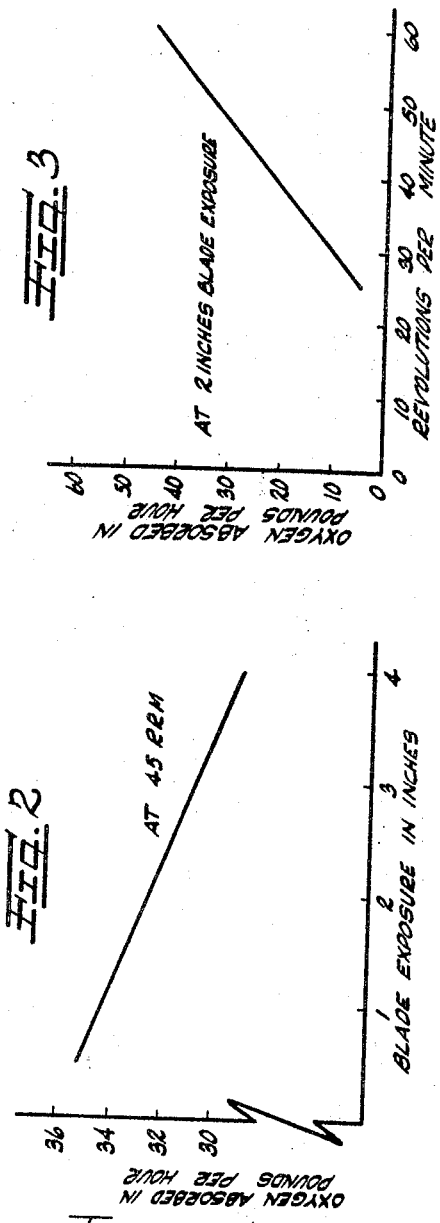
Inventor
EUGENE J. SMITH
By Anderson, Luedeka, Fitch, Even, & Tabin
Attys.

United States Patent Office 3,426,899
Patented Feb. 11, 1969

3,426,899
AERATION APPARATUS
Eugene J. Smith, Valley Cottage, N.Y., assignor to Yeomans Brothers Company, Melrose Park, Ill., a corporation of Delaware
Filed July 8, 1966, Ser. No. 563,831
U.S. Cl. 210—96
Int. Cl. B01d 15/00
6 Claims

ABSTRACT OF THE DISCLOSURE

Apparatus for the aeration for liquid in a tank or the like which employs sensing means for determining the dissolved oxygen content of the liquid and an adjustable weir for controlling the level of liquid in the tank. Control means including a control circuit coupled to the weir is connected to the sensing means and is adapted to adjust the rate of introduction of oxygen in accordance with the sensed dissolved oxygen content. A plurality of rotary surface aerators may be employed and the control circuitry may be designed to change the speed of rotation and/or selectively turn aerators off and on.

---

This invention relates to apparatus for aerating liquid and, more particularly, to apparatus comprising an improved aerating system which automatically monitors and regulates the dissolved oxygen content of the aerated liquid.

Although the present invention is suitable for a variety of aeration applications, it is particularly adapted for use in connection with the treatment of sewage by the activated sludge process or variations thereof. In the activated sludge process, raw sewage is first treated to effect removal of settleable solids, as by screening or settling. The supernatant liquid recovered from this initial or primary treating is then inoculated with a bacteria-containing or "activated" sludge obtained from the previous treatment of sewage. In order to promote the growth of the bacteria introduced into the sewage by the sludge, the sewage is subjected to an aeration operation, usually accomplished in an aeration tank.

Several types of aerating devices have been used to introduce oxygen into sewage. One type of device involves the use of a power-driven rotary surface aerator which includes a rotor carrying a plurality of vanes or blades. The rotor is mounted at the surface of the liquid in the aeration tank with its blades partially submerged in the liquid. A draft tube or an encircling baffle may be employed if desired. Rotation of the aerator draws liquid from the bottom of the tank and spreads the liquid over the tank surface. An example of such a mechanical surface aerator is shown and described in U.S. Patent No. 2,323,437. Other frequently used aeration devices utilize perforated plates or other bodies of porous material, such as fused silicon carbide, through which air is forced under substantial pressure into the liquid in the aeration tank.

The flow and/or strength and/or characteristics of sewage introduced into an aeration tank is usually not on a constant basis, but usually reaches daily peak inflows in the morning and evening. Because sewage should be aerated to minimum standards, that is, the dissolved oxygen content of the treated sewage should exceed a given level, it may be necessary during peak periods to introduce oxygen into the liquid at increased rates. During periods of low flows, it may be desirable to introduce oxygen at lower rates. In the rotary surface aerator type of device, the rate of oxygen intake may be increased by increasing the speed of the mechanical aerator, or by varying the depth to which the mechanical aerator blades are submerged. In the case of the forced-air type device, oxygen introduction rates may be varied by changing the pressure of the air being introduced or by changing the size of the openings or the porosity of the material through which the air passes to enter the liquid.

During the treatment of sewage by the activated sludge process, as pointed out above, minimum levels of dissolved oxygen content should be maintained for effective processing. One way of insuring that the dissolved oxygen content is always satisfactory is to operate the apparatus in a manner such that the actual oxygen input equals or exceeds the estimated maximum required oxygen input (the latter usually being derived by periodic chemical analysis). The natural consequence of this technique is that, when the actual requirements are lower, the oxygen input is higher than it needs to be and power thus is wasted and overaeration, possibly harmful to the process, may result.

Accordingly, it is an object of this invention to provide improved apparatus for aerating liquid.

Another object of the invention is to provide aeration apparatus which minimizes operating costs.

Still another object of the invention is to provide apparatus comprising an improved aerating system which closely follows the actual required oxygen input of the liquid being aerated to minimize electrical power requirements.

Other objects and the various advantages of the invention will become apparent to those skilled in the art from the following description taken in connection with the accompanying drawings wherein:

FIGURE 1 illustrates apparatus constructed in accordance with the invention, partially in elevation, partially in full section, and partially in schematic;

FIGURE 2 is a graph illustrating the relation between oxygen absorption of a fluid and the depth to which the blades of a rotary surface aerator are submerged; and FIGURE 3 is a graph illustrating the relation between oxygen absorption of a fluid with respect to the speed of a rotary surface aerator.

The apparatus of the invention includes an aeration tank 11 for containing the liquid 12 to be aerated. Aerating devices 13 are provided for introducing oxygen into the fluid in the tank at variable rates. Control means 14, 26 are also provided and are adapted to adjust the rate at which oxygen is introduced into the fluid. Sensing means 16 are coupled to the control means and operate to determine the dissolved oxygen content of the liquid in the tank. The signal sent by the sensing means to the control means serves to cause the control means to adjust the rate at which oxygen is introduced into the fluid in accordance with the sensed dissolved oxygen content.

Referring now in greater detail to the drawings, the apparatus is illustrated in connection with a sewage aeration tank 11 which is rectangular, having four vertical walls 17 preferably constructed of concrete or other durable material. The lower portions of the walls 17 are slightly inclined towards the center of the tank as they intersect the bottom 18 of the tank. This prevents sludge from settling in the corners. An inlet 19 extends through an opening 21 in a wall 17 of the tank to permit influent to enter the tank.

In order to permit effluent to discharge from the tank 11, an effluent discharge outlet 22 is provided at the top of the right-hand wall 17. The discharge outlet 22 spans substantially the entire length of the right-hand wall 17. A discharge trough 23 is provided for conducting the effluent which is discharged through the outlet 22 to a settling tank (not shown). A movable weir or gate 24 separates the discharge outlet 22 from the discharge trough 23. A weir control mechanism 26 is suitably coupled to the weir 24 to regulate the amount of liquid discharged from the tank. As will be subsequently explained, the control mechanism 26 acts as a servomechanism in the invention.

The illustrated apparatus includes three rotary surface aeration devices. It is to be understood, however, that any number of such aeration devices may be utilized in accordance with the invention. All three of the aeration devices 13 are identical and, consequently, only one will be described in detail.

A bridge 29 extends across the top of the tank 11 in the vicinity of each device 13 and supports a motor drive mechanism 31. The drive mechanism 31 is connected by a drive shaft 32, which passes through a suitable opening 33 in the bridge, to a rotor 34 which carries a plurality of vanes or blades 36. The blades 36 are submerged partially in the liquid 12 and, when rotated, project liquid out over the upper surface of liquid in the tank and create an upward flow in the region thereof drawing liquid from the vicinity of the bottom 18 of the tank.

In operation, sewage is continually introduced into the tank 11 through the inlet 19. The liquid sewage within the tank contains bacteria-containing sludge from previous sewage treatments. The drive mechanism 31 drives the rotor 34 and its blades 36. The movement of the blades draws sewage from near the tank bottom 18 and projects it through the atmosphere, distributing it over the surface of the liquid within the tank and thereby aerating the liquid and promoting the growth of bacteria. The action of the rotor 34 establishes a circulation of sewage throughout the tank 11.

As previously mentioned, the sewage inflow and strength during normal operation is not constant, but may vary throughout the day. In order to minimize the excess use of electrical power, the aeration rate of the fluid in the tank should be maintained as close as possible to the actual requirements of the system. Time-consuming and cumbersome chemical analysis methods for monitoring the dissolved oxygen of the liquid in the tank make it extremely difficult to provide close regulation. The invention permits relatively close tracking of the oxygen requirements by providing an aerating system which continuously monitors the dissolved oxygen content and automatically regulates the aeration rate of the liquid accordingly.

In connection with mechanical rotary surface aerator devices of the type illustrated, there are at least two simple ways of regulating the aeration rate of the liquid. FIGURE 2 illustrates the variation in pounds of oxygen absorbed per hour in a test fluid utilizing a representative mechanical surface aerator versus the amount of submergence of the blades. It will be seen from FIGURE 2 that the further the aerator blades are submerged in the fluid (i.e., the less the blade exposure), the higher the rate of oxygen absorption in the fluid, maintaining the speed of the rotor constant. From this it is seen that the rate of oxygen absorbed varies inversely with blade exposure.

Referring to FIGURE 3, oxygen absorption rate is plotted versus variation in rotor speed of the same type of aerator, holding the submergence of the blades constant at a two-inch blade exposure. This graph shows that the oxygen absorption rate varies directly with the rotor speed.

Higher speed operation of the rotary surface aerator or deeper blade submergence requires more power because a larger amount of liquid is being moved. By utilizing the invention, however, the oxygen absorption rate of the illustrated system is closely regulated in accordance with the results of a continuous monitoring of the dissolved oxygen content. Variation of the oxygen absorption rate may be accomplished by controlling the speed of the aeration device or devices, by controlling the number of such devices in operation, or by controlling the level of the fluid 12 in the tank 11 in order to control the depth of submergence of the blades.

In order to accomplish the foregoing, an electrical control circuit 14 is provided. The control circuit may be designed in accordance with the particular requirements of the system to take into account all the operating factors bearing upon the rate of oxygen absorption. Such factors would include the liquid level, the oxygenation capacity of the particular aerators utilized, the oxygen demand of the biological system and the oxygen-absorbing characteristics of the biological system. The control circuit 14 may also take into account lags due to the inherently slow response of the system. Known circuit design techniques are capable of achieving a correlation between the consumed power and the required power of the system to within plus or minus two percent.

Monitoring of the dissolved oxygen content is accomplished by means of a dissolved oxygen sensing head 16. A sampling pump 38 withdraws a sample through a tube 39 and deposits it in a reservoir 41 in which the sensing head 16 is submerged. Fluid may be drained from the reservoir 41 through a drain tube 42 and a suitable control valve, not shown. It is often desirable to maintain the reservoir 41 at a constant temperature to assure stability in the readings from sensor 16. By suitable operation of the sampling pump 38 and the sensor 16, the dissolved oxygen content of the liquid may be monitored continuously or at desired intervals.

The sensing head 16 provides electrical signals proportional to the dissolved oxygen content of the liquid. These signals are amplified by an amplifier 43 and are then connected to the control circuit 14. A recorder 44, which may be of a graphical or other type, operates to provide a continuous record of the dissolved oxygen content of the system in accordance with the output of the amplifier 43.

In the illustrated apparatus, the control circuit 14 is shown connected to the weir control mechanism or servomechanism 26 and also connected to each of the motor drive mechanisms for the aeration devices 13. In accordance with the type of operation desired, when the oxygenation requirements diminish, the control circuit may operate to turn off one or more of the devices 13, may serve to reduce their speed, or may serve to lower the weir 24 to increase the exposure of the blades of the devices. The control circuit in the drawing is shown as capable of performing all of these functions and may utilize any combination of these methods. It is to be understood, however, that the control circuit may be designed or connected to only perform one or two of the three functions mentioned in accordance with the invention. Similarly, when oxygenation requirements increase, the control circuit may operate to increase the number of the devices 13 in operation, increase their speed, or raise the weir 24 to decrease blade exposure.

Although the illustrated apparatus utilizes the rotary surface aerator, it is to be understood that the invention is applicable to other types of aeration apparatus, for example, the type utilizing forced air through a perforated or porous plate. In the latter type of device, the control circuit may operate to regulate the pressure of the air being forced into the liquid, or may operate to regulate a control mechanism which, in turn, regulates the size of the openings or the porosity of the material through which the air is passing. It may also be utilized with a type of dual blade turbine where the upper blade is either engaged or disengaged depending on the regulation of the liquid surface.

It may therefore be seen that the invention provides improved apparatus for aerating liquid. The invention has particular application to sewage treatment systems utilizing the activated sludge process. The system automatically regulates the dissolved oxygen content of the aerated liquid, and, accordingly, more closely controls the needed electrical power for operation of the system. Various other embodiments and modifications thereof in addition to those shown and described herein will be apparent to those skilled in the art. Such other embodiments and modifications thereof are intended to fall within the scope of the appended claims.

What is claimed is:

1. Apparatus for aerating liquid including in combination, an aeration tank for containing the liquid, aerating means for introducing oxygen into the liquid in the tank at various rates, control means adapted to adjust the rate of introduction of oxygen including an adjustable weir and a control circuit coupled thereto for controlling the level of the liquid in said aeration tank by raising or lowering said weir, and sensing means for determining the dissolved oxygen content of the liquid in the tank, said sensing means being coupled to said control means for adjusting said rate in accordance with the sensed dissolved oxygen content.

2. Apparatus in accordance with claim 1 wherein said aerating means comprise at least one rotary surface aerator.

3. Apparatus in accordance with claim 2 wherein said control means comprise a control circuit connected to said rotary surface aerator for controlling the speed thereof.

4. Apparatus in accordance with claim 1 wherein said aerating means comprise a plurality of aerating devices and wherein said control means are connected to each of said aerating devices for selectively turning said devices on and off.

5. Apparatus for aerating liquid, including in combination, an aeration tank for containing the liquid, a rotary surface aerator in said tank having a plurality of blades partially submerged in the liquid, an adjustable weir for controlling the level of the liquid in said aeration tank to thereby regulate the depth to which said blades are submerged in the liquid, a servomechanism connected to said adjustable weir for adjusting same, a control circuit coupled to said servomechanism for operating said servomechanism in accordance with electrical signals applied to said control circuit, and sensing means for producing electrical signals representing the dissolved oxygen content of the liquid in the tank, said sensing means being connected to said control circuit for applying electrical signals thereto for causing said control circuit to operate said servomechanism in accordance with the sensed dissolved oxygen content.

6. Apparatus in accordance with claim 5 wherein a plurality of rotary surface aerators are provided in said tank each having a plurality of blades partially submerged in the liquid and wherein said control circuit is also connected to each of said plurality of surface aerators and is adapted to selectively turn said aerators on and off.

References Cited

UNITED STATES PATENTS

| | | | |
|---|---|---|---|
| 2,180,148 | 11/1939 | Imhoff | 210—219 X |
| 2,299,529 | 10/1942 | Crampton | 210—96 |
| 3,198,000 | 8/1965 | Schlageter | 261—92 X |
| 3,246,763 | 4/1966 | Baum | 210—221 |
| 3,154,601 | 10/1964 | Kalinske et al. | 210—150 X |

SAMIH N. ZAHARNA, *Primary Examiner.*

J. ADEE, *Assistant Examiner.*

U.S. Cl. X.R.

210—219; 261—84, 91

Disclaimer 3,426,899.—*Eugene J. Smith*, Valley Cottage, N.Y. AERATION APPARATUS. Patent dated Feb. 11, 1969. Disclaimer filed Oct. 16, 1974, by the assignee, *Clow Corporation*.

Hereby enters this disclaimer to claims 1–4, inclusive of said patent.

[*Official Gazette April 1, 1975.*]